(12) United States Patent
Yamanaka (10) Patent No.: US 12,537,022 B2
(45) Date of Patent: Jan. 27, 2026

(54) SUSPENSION ASSEMBLY AND DISK DRIVE (71) Applicants: KABUSHIKI KAISHA TOSHIBA, Tokyo (JP); TOSHIBA ELECTRONIC DEVICES & STORAGE CORPORATION, Tokyo (JP)

(72) Inventor: Shinra Yamanaka, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/413,971

(22) Filed: Jan. 16, 2024

(65) Prior Publication Data

US 2025/0078866 A1 Mar. 6, 2025

(30) Foreign Application Priority Data

Aug. 28, 2023 (JP) .................................. 2023-137937

(51) Int. Cl.
*G11B 5/48* (2006.01)

(52) U.S. Cl.
CPC .................................. *G11B 5/4846* (2013.01)

(58) Field of Classification Search
None
See application file for complete search history.

(56) References Cited

U.S. PATENT DOCUMENTS

| 7,924,529 | B2* | 4/2011 | Ohsawa | G11B 5/486 |
| | | | | 360/244.5 |
| 8,213,121 | B2 | 7/2012 | Dela Pena et al. | |
| 8,279,560 | B1 | 10/2012 | Pan | |
| 10,373,635 | B2 | 8/2019 | Kikuchi | |
| 11,074,931 | B1* | 7/2021 | Aoki | G11B 25/043 |
| 2005/0047020 | A1* | 3/2005 | Tsuchiya | G11B 5/4853 |
| 2005/0199680 | A1* | 9/2005 | Matsumoto | H05K 3/3442 |
| | | | | 228/101 |
| 2006/0087769 | A1* | 4/2006 | Ohsawa | H05K 3/3442 |
| 2006/0139809 | A1* | 6/2006 | Matsumoto | H05K 3/3442 |
| | | | | 360/234.5 |
| 2007/0279807 | A1 | 12/2007 | Kobayashi et al. | |
| 2008/0298218 | A1* | 12/2008 | Tanaka | H05K 3/363 |
| | | | | 369/126 |

(Continued)

FOREIGN PATENT DOCUMENTS

JP 2011009335 A * 1/2011 .......... H05K 3/3452

*Primary Examiner* — William J Klimowicz
(74) *Attorney, Agent, or Firm* — Knobbe, Martens, Olson & Bear, LLP (57) ABSTRACT

According to one embodiment, a suspension assembly includes a support plate, a head supported by the support plate, and a wiring member provided on the support plate, and constituted by a stacked layer body. The wiring member includes a distal portion electrically connected to the head, a connection end portion extending to an outside of the support plate, and a plurality of wirings. The connection end portion includes an opening extending in a first direction, a plurality of connection terminals each formed by a conductive layer and arranged in the first direction in the opening, and a partition provided at the connection terminal to protrude from the side of the second insulating layer.

9 Claims, 11 Drawing Sheets

(56) References Cited

U.S. PATENT DOCUMENTS

| | | | |
|---|---|---|---|
| 2010/0326726 A1* | 12/2010 | Tanaka | H05K 3/363 |
| | | | 174/84 R |
| 2012/0099221 A1* | 4/2012 | Ho | G11B 5/4826 |
| | | | 29/603.07 |
| 2018/0277150 A1* | 9/2018 | Kikuchi | H05K 1/028 |
| 2022/0159833 A1* | 5/2022 | Zhu | H05K 1/028 |

* cited by examiner

SUSPENSION ASSEMBLY AND DISK DRIVE

CROSS-REFERENCE TO RELATED APPLICATIONS

This application is based upon and claims the benefit of priority from Japanese Patent Application No. 2023-137937, filed Aug. 28, 2023, the entire contents of which are incorporated herein by reference.

FIELD

Embodiments described herein relate generally to a suspension assembly used for a disk drive and a disk drive comprising the same.

BACKGROUND

As a disk drive, for example, a magnetic disk drive generally comprises a magnetic disk provided in a base, a spindle motor which supports and rotates the magnetic disk, and a head actuator. The head actuator includes a plurality of suspension assemblies each supporting the magnetic head. Each of the suspension assemblies comprises a suspension attached to a distal end of an arm of the head actuator, and a wiring member (a flexure and a wiring trace) installed on the suspension. The magnetic head is supported at a gimbal portion of the wiring member, and a head suspension assembly is thereby constituted. A plurality of connection terminals are provided at the connection ends of the wiring member. These connection terminals are electrically connected to the magnetic heads via wires of the wiring members. Then, the connection terminals of the connection ends are soldered to the connection pads of the flexible printed circuit board (FPC) provided in the actuator block.

In the magnetic disk drives having the above structure, if the connection end of the head suspension assembly and the connection pad of the FPC are displaced, there is a concern that the solder at a joint portion may short-circuit. If the number of magnetic disks and magnetic heads increases, or as the functions of the magnetic heads increase and the number of connection terminals increases and as the pitch between the terminals is smaller, a risk of short circuit increases.

In addition, there is a problem that if the connection end of the head suspension assembly and the connection pad of the FPC are displaced, the solder may be unevenly distributed and solder may not spread sufficiently to the side of the connection terminals, and bonding failure may occur.

DETAILED DESCRIPTION

Various embodiments will be described hereinafter with reference to the accompanying drawings. In general, according to one embodiment, a suspension assembly comprises: a support plate; a head supported by the support plate; and a wiring member provided on the support plate, and constituted by a stacked layer body including a first insulating layer, a conductive layer provided on the first insulating layer to form wirings and a connection terminal, and a second insulating layer formed to overlap with the conductive layer and the first insulating layer. The wiring member includes a distal portion electrically connected to the head, a connection end portion extending to an outside of the support plate, and wirings extending between the distal portion and the connection end portion. The connection end portion includes an opening extending in a first direction, connection terminals formed by the conductive layer and arranged in the first direction in the opening, and a partition provided at the connection terminal to protrude from the side of the second insulating layer.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. Furthermore, in the description and figures of the present application, structural elements having the same or similar functions will be referred to by the same reference numbers and detailed explanations of them that are considered redundant may be omitted.

First Embodiment

A hard disk drive (HDD) according to a first embodiment will be described in detail as a magnetic disk drive.

Figure 1:
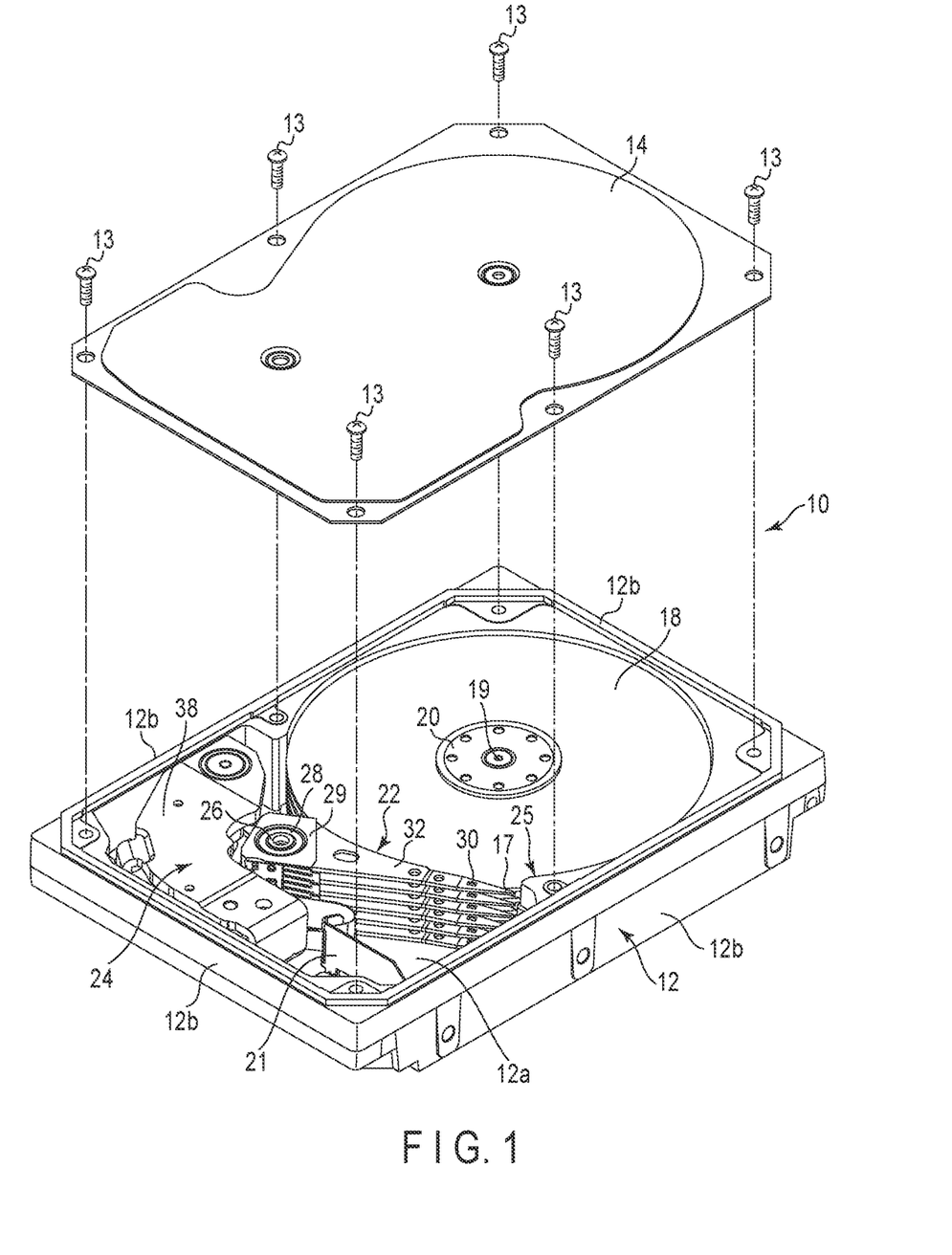
FIG. 1 is an exploded perspective view showing a hard disk drive (HDD) according to a first embodiment.

FIG. 1 is an exploded perspective view showing the HDD according to the first embodiment with a top cover detached.

The HDD comprises a housing 10 in a flat and substantially rectangular shape. The housing 10 comprises a base 12 shaped in a rectangular box which is open on its upper side, and a top cover 14. The base 12 includes a rectangular bottom wall 12a opposed to and spaced apart from the top cover 14, and a plurality of sidewalls 12b erected along peripheral edges of the bottom wall 12a, and is formed of, for example, aluminum and molded integrally as one body. The top cover 14 is formed of, for example, stainless steel in the shape of a rectangular plate. The top cover 14 is secured to the sidewalls 12b of the base 12 by a plurality of screws 13 to close the upper opening of the base 12.

A plurality of magnetic disks 18 serving as recording media, and a spindle motor 19 serving as a driving unit which supports and rotates the magnetic disks 18, are provided in the housing 10. The spindle motor 19 is arranged on the bottom wall 12a. Each of the magnetic disks 18 is formed in a disk shape having a diameter of, for example, 96 mm (3.5 inches), and includes a substrate formed of a non-magnetic material, for example, glass or aluminum, and a magnetic recording layer formed on the upper surface and/or lower surface of the substrate. The magnetic disk 18 is fitted coaxially in a hub (not shown) of the spindle motor 19, and is clamped by a clamp spring 20. The magnetic disks 18 are supported to be substantially parallel to the bottom wall 12a of the base 12. The plurality of magnetic disks 18 are rotated at a predetermined number of revolutions by the spindle motor 19. Incidentally, in the embodiment, for example, five magnetic disks 18 are accommodated in the housing 10, but the number of magnetic disks 18 is not limited to this.

A plurality of magnetic heads 17 that record information on the magnetic disks 18 and reproduce the information, and an actuator assembly (carriage assembly) 22 which supports the magnetic heads 17 to be freely movable to the magnetic disks 18 are provided in the housing 10. In addition, a voice coil motor (hereinafter referred to as VCM) 24 which rotates and positions the actuator assembly 22, a ramp load mechanism 25 which holds the magnetic heads 17 at an unloading position separated from the magnetic disks 18 when the magnetic heads 17 are moved to the outermost circumference of the magnetic disks 18, and a board unit (FPC unit) 21 on which electronic components such as conversion connectors are mounted, are provided in the housing 10. The actuator assembly 22 and the VCM 24 constitute the head actuator.

A printed circuit board (not shown) is screwed to an outer surface of the bottom wall 12a of the base 12. The printed circuit board constitutes a control unit, and the control unit controls the operation of the spindle motor 19, and also controls the operation of the VCM 24 and the magnetic heads 17 via the board unit 21.

Figure 2:
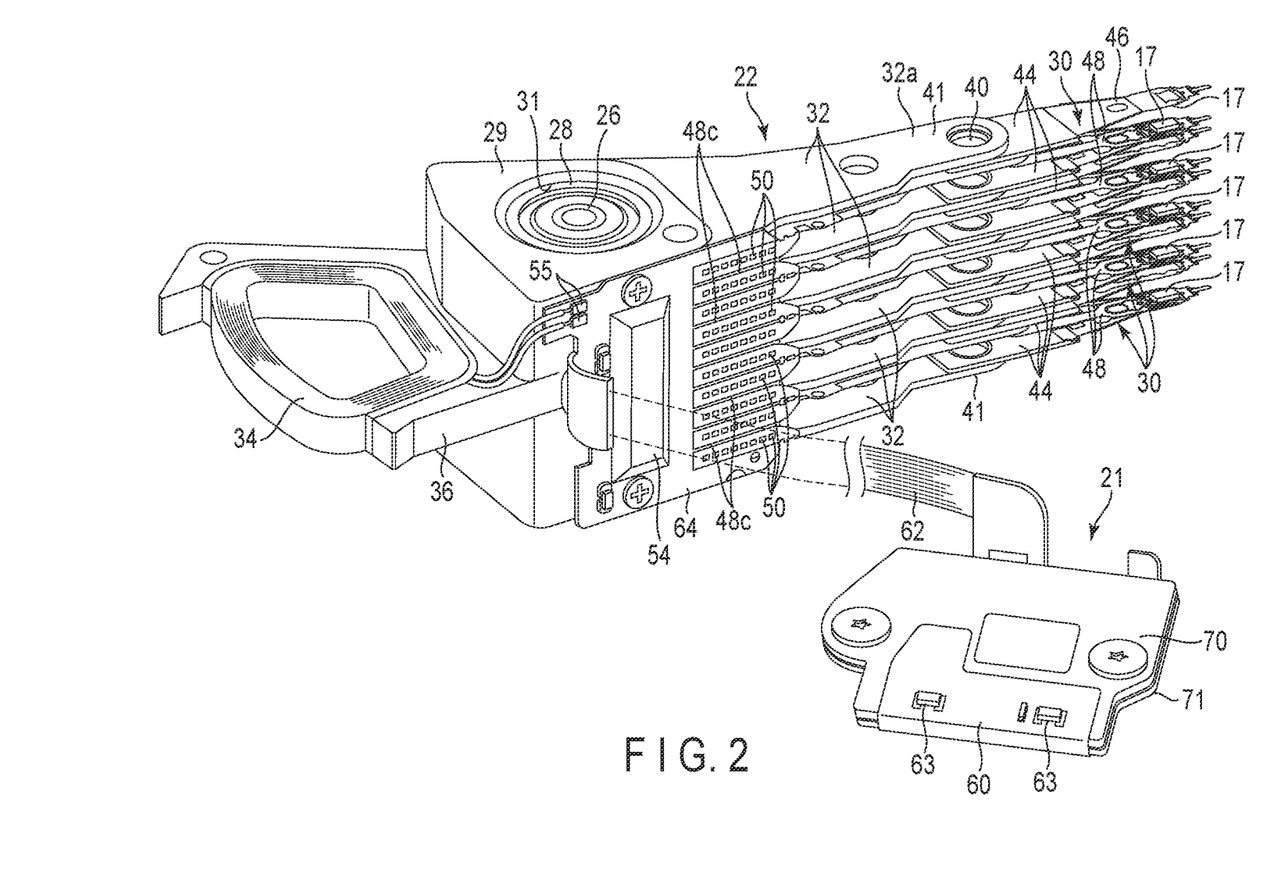
FIG. 2 is a perspective view showing an actuator assembly and a board unit (FPC unit) of the HDD.
Figure 3:
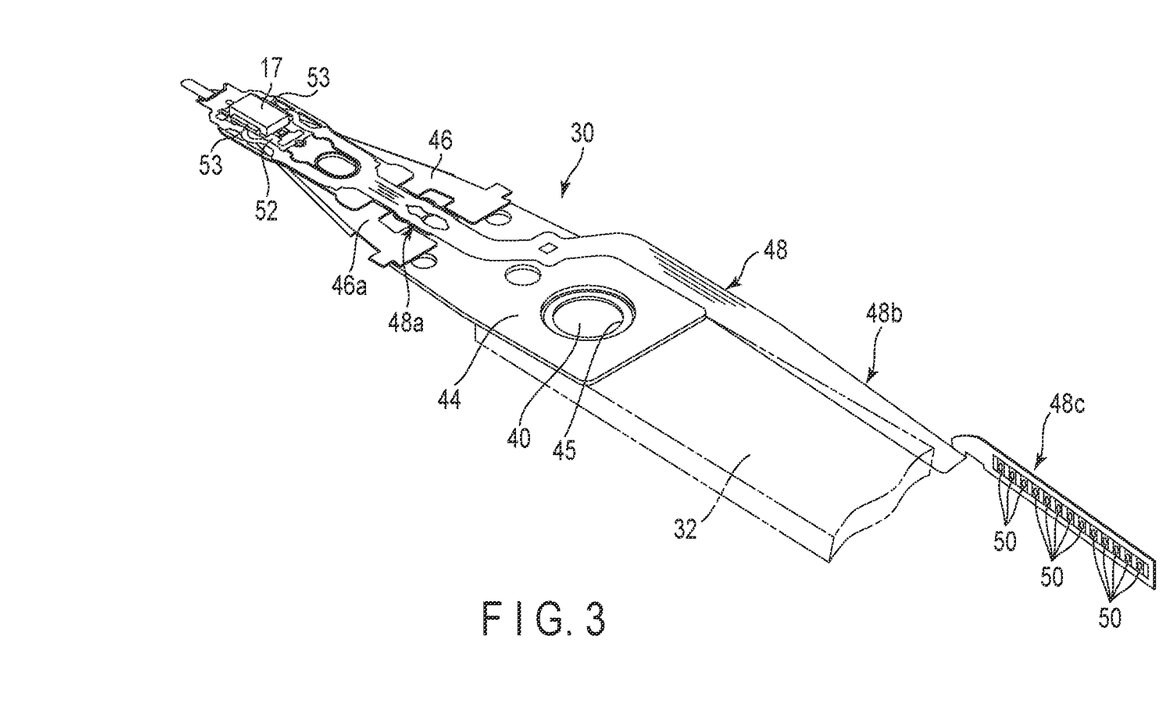
FIG. 3 is a perspective view showing a suspension assembly of the actuator assembly.

FIG. 2 is a perspective view showing the actuator assembly and the FPC unit, and FIG. 3 is a perspective view showing the suspension assembly. As shown in FIG. 2, the actuator assembly 22 comprises an actuator block 29 including a transparent hole 31, a bearing unit 28 (unit bearing) 28 provided in the transparent hole 31, a plurality of, for example, six arms 32 extending from the actuator block 29, suspension assemblies 30 attached to the respective arms 32, and the magnetic heads 17 supported on the suspension assemblies 30. The actuator block 29 is supported to be freely rotatable around a support shaft (axis) 26 erected on the bottom wall 12a, by the bearing unit 28. The magnetic head 17 includes a read head, a write head, an assist element, a heater, and the like.

In the embodiment, the actuator block 29 and six arms 32 are formed of aluminum or the like and molded as one body to constitute a so-called E block. The arms 32 are formed in a shape of, for example, an elongated flat plate, and extend from the actuator block 29 in a direction orthogonal to the support shaft 26. Six arms 32 are provided parallel and spaced apart from each other.

The actuator assembly 22 includes a support frame 36 extending from the actuator block 29 in a direction opposite to the arms 32, and the voice coil 34 is supported by the support frame 36. As shown in FIG. 1, the voice coil 34 is located between a pair of yokes 37 one of which is fixed on the base 12, and constitutes the VCM 24 together with these yokes 38 and a magnet fixed to one of the yokes 38.

As shown in FIG. 2, the actuator assembly 22 comprises ten suspension assemblies 30 which support the respective magnetic heads 17, and these suspension assemblies 30 are attached to distal portions 32a of the arms 32, respectively. The plurality of suspension assemblies 30 include up-head suspension assemblies supporting the magnetic heads 17 upwardly and down-head suspension assemblies supporting the magnetic heads 17 downwardly. The up-head suspension assembly and down-head suspension assembly are constituted by arranging the suspension assemblies 30 of the same structure upside down.

As shown in FIG. 3, the suspension assembly 30 includes a substantially rectangular base plate 44, a load beam 46 shaped in an elongated leaf spring, and a flexure (wiring member) 48 shaped in an elongated strip. The load beam 46 has its proximal portion stacked on a distal portion of the base plate 44, and is fixed to the base plate 44 by welding a plurality of portions.

The load beam 46 extends from the base plate 44 and is formed to taper toward an extension end. The base plate 44 and the load beam 46 are formed of, for example, stainless steel and constitute a support plate (suspension).

The base plate 44 includes a circular opening at its proximal portion and an annular projection 45 located at the circumference of the opening. The projection 45 of the base plate 44 is fitted in a swaging hole 40 formed at the distal portion 32a of the arm 32, the projection 51 is swaged, and the base plate 44 is thereby fastened at the distal portion 32a of the arm 32 (see FIG. 2).

The flexure 48 of the suspension assembly 30 includes a metal plate such as stainless steel serving as a base (backing layer) and a flexible printed circuit board (FPC) installed on the metal plate, forming a stacked plate having an elongated strip shape.

The flexure 48 includes a distal side portion 48a and a proximal side portion 48b. The distal side portion 48a is attached to the load beam 46 and the base plate 44. The proximal side portion 48b extends from a side edge of the base plate 44 to the outside and further extends to the proximal portion (actuator block 29) of the arm 32 along the arm 32.

The distal side portion 48a of the flexure 48 includes a distal portion located on the load beam 46 and a gimbal portion (elastic support portion) 52 which is formed at the distal portion and can be freely displaced. The magnetic head 17 is mounted on the gimbal portion 52. In addition, a pair of piezoelectric elements 53 that constitute a microactuator are mounted on the gimbal portion 52 and are arranged on both sides of the magnetic head 17. The distal portion of the flexure 48 is electrically connected to a read head element, a write head element, a heater, an assist element, an HDI sensor, other components, and piezoelectric elements 53 of the magnetic head 17 via wires and connection pads (not shown).

The flexure 48 includes a connection end portion (tail connection end portion) 48c provided at an end of the proximal side portion 48b. The connection end portion 48c is shaped in an elongated rectangle. The connection end portion 48c is bent at substantially right angles to the proximal side portion 48b and located at a position substantially orthogonal to the arm 32. A plurality of, for example, thirteen connection terminals 50 are provided on the connection end portion 48c. These connection terminals 50 are connected to the respective wirings of the flexure 48. In other words, a plurality of wirings of the flexure 48 extend along a substantially full length of the flexure 48, each having an end connected electrically to the magnetic head 17 and the other end connected to the connection terminal (connection pad) 50 of the connection end portion 48c.

As shown in FIG. 2, the FPC unit 21 integrally includes a substantially rectangular base portion 60, a relay portion 62 shaped in an elongated strip extending from a one-side edge of the base portion 60, and a substantially rectangular joint portion (corresponding to a wiring board) 64 provided continuously with the distal portion of the relay portion 62. The base portion 60, relay portion 62, and joint portion 64 are formed by a flexible printed circuit board (FPC).

Electronic components such as a conversion connector (not shown) and a plurality of capacitors 63 are mounted on one of surfaces (outer surface) of the base portion 60 and are electrically connected to wirings (not shown). Two metal plates 70 and 71 that function as reinforcing plates are stuck to the other surface (inner surface) of the base portion 60. The base portion 60 is arranged on the bottom wall 12a of the housing 10 and fixed to the bottom wall 12a by two screws. The conversion connector on the base portion 60 is connected to a control circuit board provided on the bottom surface side of the housing 10.

The relay portion 62 extends from the base section 60 toward the actuator assembly 22. The joint portion 64 provided at the extended end of the relay section 62 is formed in a rectangular shape with a height and a width substantially equal to the side surface (installation surface) of the actuator block 29. The joint portion 64 is applied to the installation surface of the actuator block 29 via a backing plate formed of aluminum or the like, and is further screwed and fixed to the installation surface with a fixing screw.

The connection end portions 48c of ten flexures 48 are joined to a plurality of connection portions of the joint portion 64 and electrically connected to the wirings of the joint portion 64. The plurality of connection end portions 48c are arranged in a direction parallel to the support shaft 26. In addition, a head IC (head amplifier) 54 is mounted on the joint portion 64. The head IC 54 is connected to the connection end portion 48c and the base 60 via the wirings of the FPC. Furthermore, the joint portion 64 includes a pair of connection pads 55, and the voice coil 34 is connected to the connection pads 55.

Each of ten magnetic heads 17 of the actuator assembly 22 is electrically connected to the base portion 60 through the wirings of the flexure 48, the connection end portion 48c, the joint portion 64 of the FPC unit 21, and the relay portion 62. Furthermore, the base portion 60 is electrically connected to the printed circuit board on the bottom surface side of the housing 10 via the conversion connector.

Figure 4:
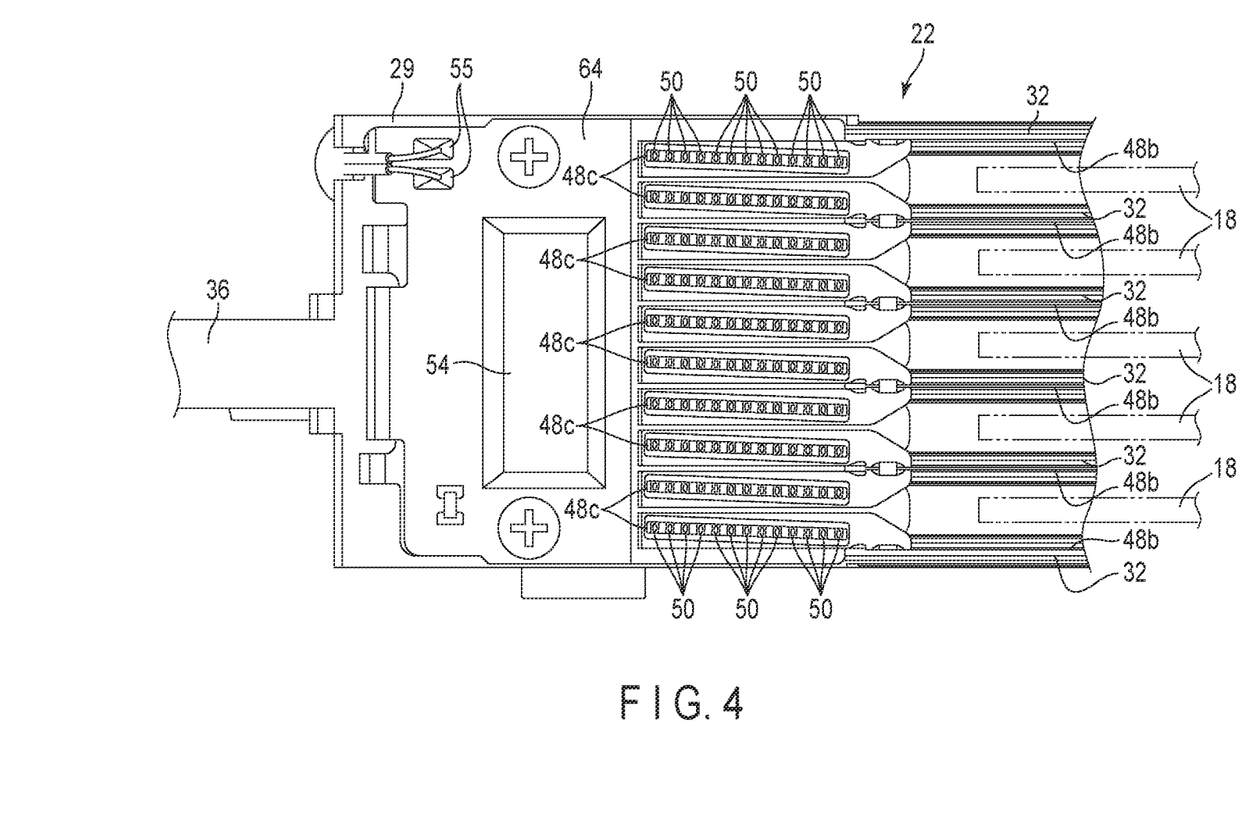
FIG. 4 is a side view showing an actuator block of the actuator assembly, a joint portion (FPC joint portion) of the FPC unit, and a tail connection end of a flexure.

The wiring structure of the joint portion 64 will be described in detail. FIG. 4 is a side view showing the joint portion 64 and a plurality of connection end portions mounted on the actuator block, and FIG. 5 is a side view showing the joint portion 64 to which the connection end portions are to be joined.

Figure 5:
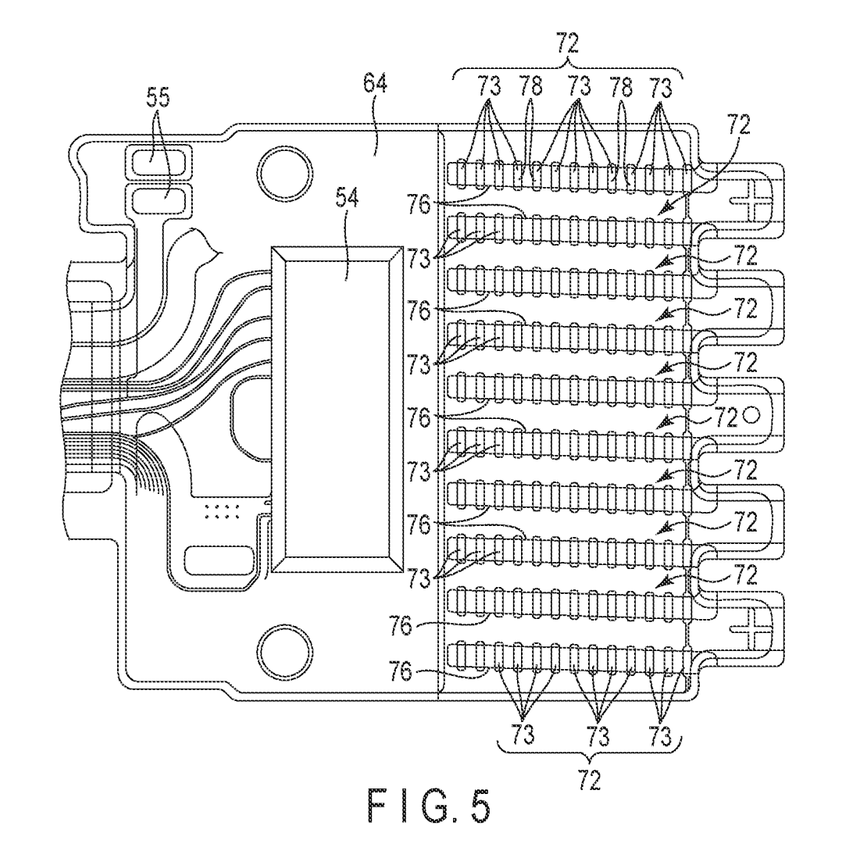
FIG. 5 is a side view showing the joint portion of the FPC unit.

As shown in FIG. 5, the joint portion 64 of the FPC includes ten connection pad groups 72 corresponding to the connection end portions 48c of the suspension assemblies 30. Each connection pad group 72 includes a plurality of, for example, thirteen connection pads 73 provided in a row. Each connection pad 73 is electrically connected to the head IC 54 or the base portion 60 via wirings. Thirteen connection pads 73 of each connection pad group 72 are arranged in a row in a direction substantially parallel to the arm 32 and spaced apart from each other at regular intervals. In addition, ten connection pad groups 72 are spaced apart from each other at regular intervals and arranged substantially parallel to each other, in a direction parallel to the support shaft 26, i.e., a height direction of the actuator block 29. These connection pads 73 are located within a strip-shaped groove 76 formed in the cover insulation layer of the joint portion 64, which will be described later, and are exposed to the outside through this groove 76. In addition, a solder layer 78 is formed on each of the connection pads 73 in a state in which the connection ends 48c are to be joined.

As shown in FIG. 4 and FIG. 5, the joint portion 64 of the FPC is fixed to the installation surface of the actuator block 29 via a backing plate. The connection end portion 48c of the flexure 48 is arranged to overlap with each connection pad group 72 of the joint portion 64. The connection terminals 50 of the connection ends 48c abut on the corresponding connection pads 73, respectively, via the solder layer 78. As described below, each connection terminal 50 is soldered mechanically and electrically to the corresponding connection pad 73 by, for example, melting the solder layer 78 by laser irradiation.

Next, the configuration of the flexure 48 and the detailed configuration of the tail connection end portion 48c will be described.

Figure 6:
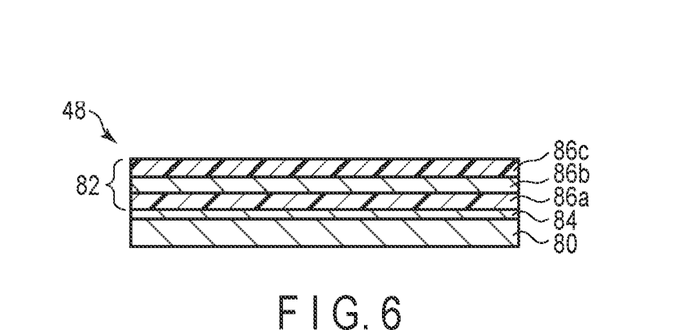
FIG. 6 is a cross-sectional view showing the flexure.
Figure 7:
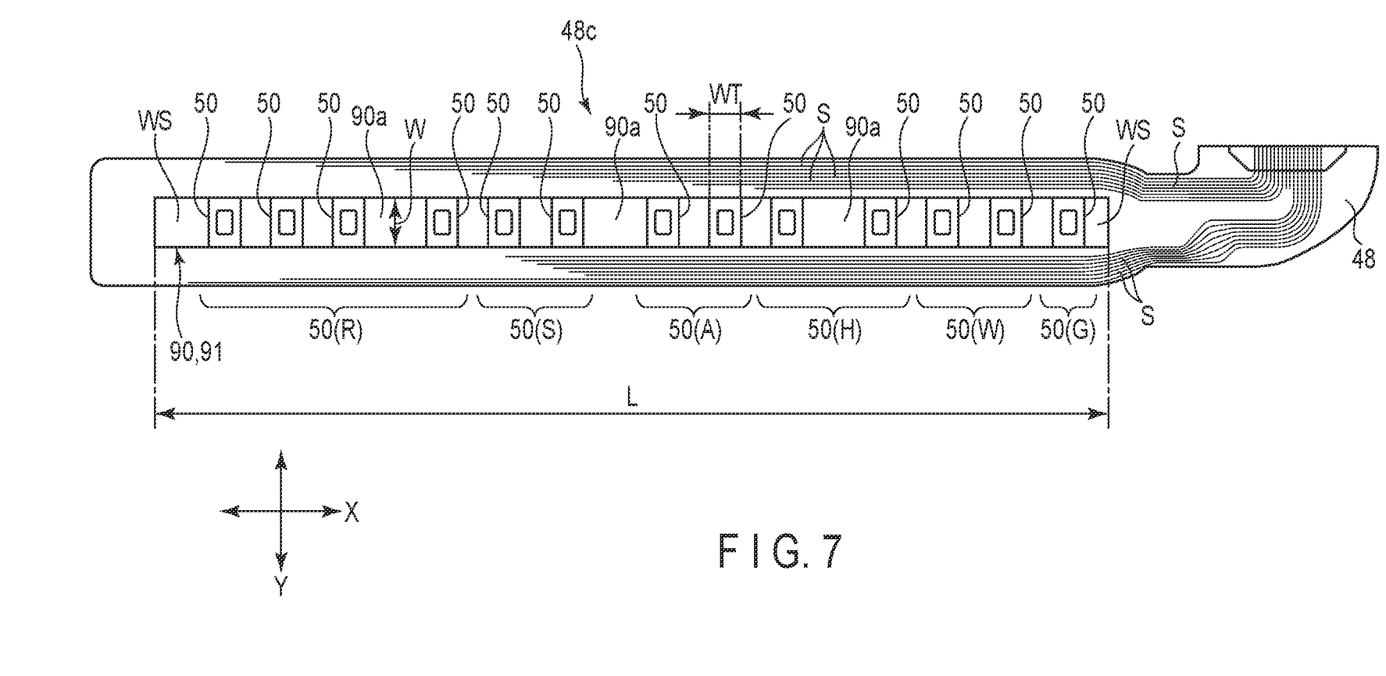
FIG. 7 is a plan view showing the tail connection end of the flexure.

FIG. 6 is a cross-sectional view showing a stacked layer structure of the flexure 48, and FIG. 7 is an enlarged plan view showing the connection end portion of the flexure.

As shown in FIG. 6, the flexure 48 includes a metal plate (backing layer) 80 formed of stainless steel or the like, which serves as the base layer, and a flexible printed circuit board (FPC) 82 formed on the metal plate. In the embodiment, an adhesive layer (heat insulation layer) 84 is provided between the metal plate 80 and the FPC 82. In addition, the FPC 82 is composed of a stacked layer body including a base insulating layer (first insulating layer) 86a, a conductive layer 86b stacked on the base insulating layer 86a, and a cover insulating layer (second insulating layer) 86c stacked on the base insulating layer 86a and the conductive layer 86b. The base insulating layer 86a and the cover insulating layer 86c are formed of, for example, polyimide. The conductive layer 86b is formed of, for example, copper foil, and a plurality of wirings, connection terminals, and connection pads are constituted by patterning the copper foil. The thickness of the conductive layer (copper foil) 86b is, for example, 9 μm or less. Incidentally, the FPC 82 is not limited to a single-layer structure, but a multilayer FPC with a plurality of conductive layers and a plurality of cover insulating layers can also be used. In addition, the adhesive layer (heat insulation layer) 84 can be omitted.

As shown in FIG. 7, the connection end portion (tail connection end portion) 48c of the flexure 48 is formed in an approximately elongated rectangular shape having a predetermined length and a predetermined width. The connection end portion 48c includes a metal plate 80, a base insulating layer (first insulating layer) 86a provided on the metal plate 80, a conductive layer 86b provided on the base insulating layer 86a to form wirings and connection terminals, and a cover insulating layer (second insulating layer) 86c formed to overlap with the conductive layer 86b and the base insulating layer 86a. In FIG. 7, the lowermost layer is the cover insulating layer 86c, and the uppermost layer is the metal plate 80. The side of the cover insulating layer 86c is assumed to abut on the joint portion 64 of the FPC unit. In addition, in the drawings mentioned below, the longitudinal direction of the connection end portion 48c is defined as a first direction X, and the width direction of the connection end portion 48c, i.e., the direction orthogonal to the first direction X is defined as a second direction Y.

The cover insulating layer 86c includes a rectangular opening 90 formed in the center thereof. The opening 90 is formed to have, for example, a length L in the longitudinal direction (first direction X) of 6 mm or less and a width W in the second direction Y of 0.5 mm. The thirteen connection terminals 50 described above are each arranged to be opposed to the opening 90 and spaced apart in the longitudinal direction of the aperture 90. Each of the connection terminals 50 has, for example, a rectangular shape and extends from one end to the other end of the cover insulating layer 86c in the width direction. The center portion of the connecting terminal 50 in the longitudinal direction is located within the opening 90 and constitutes a flying lead that serves as a joint portion. Both end portions of the connection terminal 50 in the longitudinal direction are located to overlap with the cover insulating layer 86c.

In the cover insulating layer 86c, a plurality of wirings S are distributed to each of areas on both sides in the width direction of the aperture 90. Each connection terminal 50 is connected to the wirings S. As a result, thirteen connection terminals 50 are electrically connected to the connection pad at the distal portion of the flexure 48 via the wirings S.

The base insulating layer 86a and the metal plate 80 are provided to overlap with the entire surface of the cover insulating layer 86c, thirteen connection terminals 50, and the wirings S. The base insulating layer 86a and the metal plate 80 have a substantially rectangular opening 91 formed in the center thereof. The opening 91 is formed to have a length and a width sufficiently larger than the opening 90 in the cover insulating layer 86c. As a result, the metal plate 80 covers the outer circumferential edge portion and the proximal end portion of the connection end portion 48c.

Figure 8:
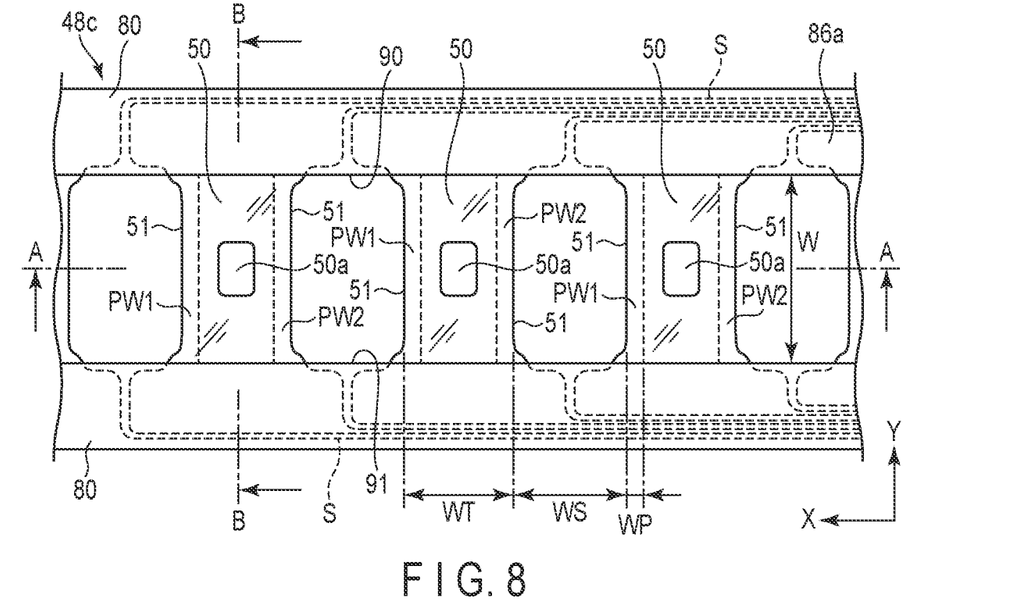
FIG. 8 is an enlarged plan view showing a part of the tail connection end.

FIG. 8 is an enlarged plan view showing a part of the connection end portion 48c. As shown in FIG. 7 and FIG. 8, a width (interval between a pair of side edges) WT of the central portion of each connection terminal 50 exposed through the openings 90 and 91 of the connection end portion 48c is formed to be, for example, 0.2 mm. An interval WS between the connection terminals 50 is set to 0.15 mm or more. The intervals WS or gaps are provided between one end of the opening 90 in the first direction X and the connection terminal 50, and between the other end of the opening 90 in the first direction X and the connection terminal 50, respectively. Incidentally, in the embodiment, exposure means not being covered with an insulating film.

The intervals between the connection terminals 50 may be set to be equal but, in the embodiment, a wide interval (for example, 0.3 mm) is set at every three connection terminals 50 from the extending end side of the connection end portion 48c. These wide interval portions 90a are provided to install jigs when the connection terminals 50 are soldered.

A through hole 50a is provided in the center of each connection terminal 50. The through hole 50a has a substantially rectangular shape in one example. A width of the through hole 50a is smaller than the width WT of the connection terminal 50 and its length is smaller than the width W2 of the opening 90. The through hole 50a communicates with the openings 90 and 91.

A rate of the area of all connection terminals 50 (including the through holes) to the area of the opening 90 is set to 40% or more, for example, 43%.

In the embodiment, thirteen connection terminals 50 are aligned in the following order. As shown in FIG. 7, in one example, four connection terminals 50 (R) for the read head, two connection terminals 50 (S) for the HDI sensor, two connection terminals 50 (A) for the assist element (high frequency assist element or heat assist element), two connection terminals 50 (H) for the heater, two connection terminals 50 (W) for the write head, and finally, one connection terminal 50 (G) for the gimbal microactuator (GMA) (piezoelectric element 53) are aligned sequentially from the extending end side of the connection end portion 48c. In other words, the connection terminals 50 (A) for the assist element are arranged in the center of the alignment direction (sixth and seventh positions from the proximal end side), the connection terminals 50 (W) for the write head are arranged at the proximal end side of the connection end portion 48c, and the connection terminals 50 (H) for the heater are provided between the connection terminals 50 (A) for the assist element and the connection terminals 50 (W) for the write head. The connection terminals 50 (R) for the read head are arranged at the distal end side of the connection end portion 48c, and the connection terminals 50 (S) for the HDI sensor are provided between the connection terminals 50 (A) for the assist element and the connection terminals 50 (R) for the read head.

Incidentally, the alignment of the connection terminals 50 is not limited to the above alignment, but may be any other alignment. To avoid crosstalk, the connection terminals for the write head and the connection terminals for the read head may be aligned so as not to be adjacent to the connection terminals for the assist element.

Figure 9:
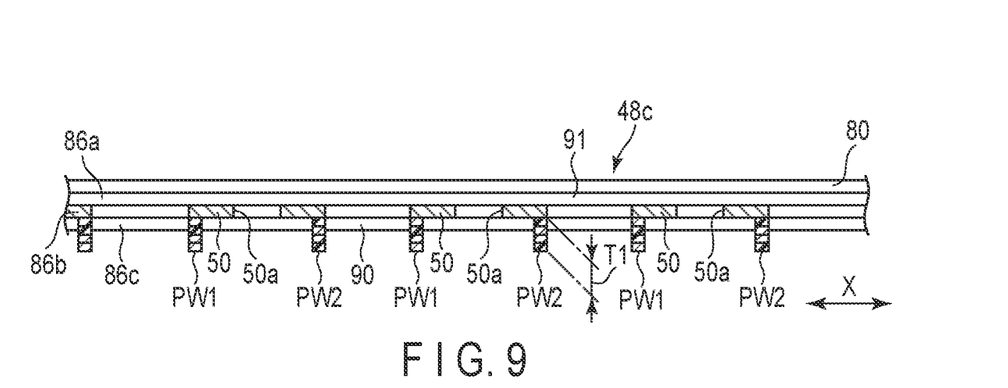
FIG. 9 is a cross-sectional view showing the tail connection end along line A-A of FIG. 8.
Figure 10:
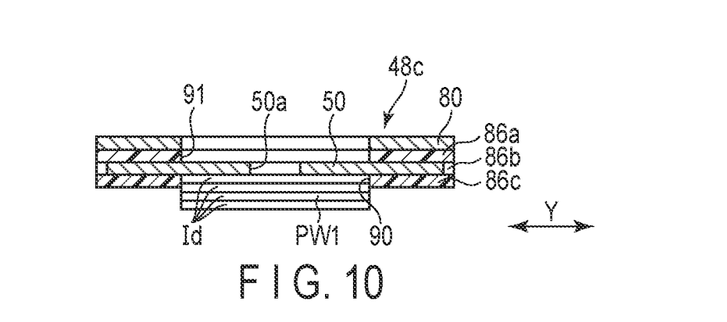
FIG. 10 is a cross-sectional view showing the tail connection end along line B-B of FIG. 8.

FIG. 9 is a cross-sectional view showing the connection end 48c along line A-A in FIG. 8, and FIG. 10 is a cross-sectional view showing the connection end 48c along line B-B in FIG. 8.

As shown in FIG. 8, each of the connection terminals 50 has a pair of side edges 51 that are substantially parallel to each other. The pair of side edges 51 extend in a direction that intersects the first direction X (longitudinal direction). In the embodiment, the pair of side edges 51 extend in the second direction Y across the opening 90.

As shown in FIG. 8, FIG. 9, and FIG. 10, two partitions PW1 and PW2 are erected on the surface of each connection terminal 50 on the side of the cover insulating layer 86c. The partitions PW1 and PW2 are provided along the pair of side edges 51 of the connection terminals 50 and each of the partitions extends along the second direction Y for the substantially entire width W of the opening 90. The partitions PW1 and PW2 project downward (toward the side of the FPC joint portion 64 to be described below) from the connection terminals 50 beyond the cover insulating layer 86c.

In one example, the width WP in the first direction X of the partitions PW1 and PW2 is formed to be ⅙ to ¼ of the width WT of the connection terminal 50, for example, 0.03 to 0.06 mm, and the protrusion height T1 is formed to be approximately 0.04 to 0.1 mm. The length of the partitions PW1 and PW2 in the second direction Y is formed to be approximately ½ to ¼ of the width of the groove 76 (see FIG. 5) of the above-mentioned joint portion 64.

In the embodiment, each of the partitions PW1 and PW2 is constituted by stacking a plurality of, for example, four insulating layers Id. The number of layers can be changed as appropriate according to the height of the partitions.

Figure 11:
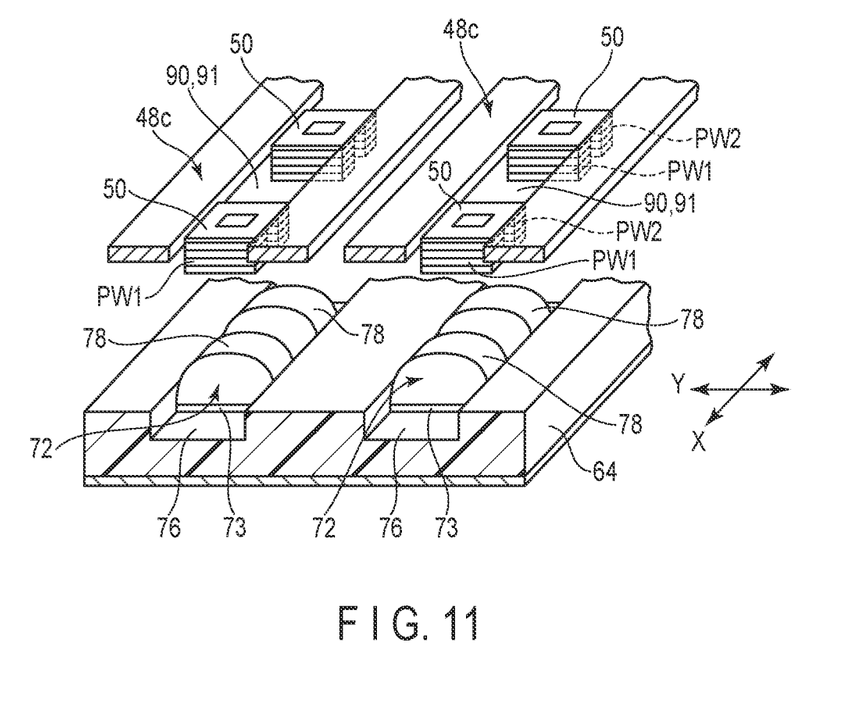
FIG. 11 is an exploded perspective view schematically showing the tail connection end and the FPC joint portion.

FIG. 11 is a schematically perspective view showing the tail connection end portion 48c and the joint portion 64 on the FPC side at the joining. As shown in the drawing, each connection end portion 48c is arranged to be stacked on the connection pad group 72 of the joint portion 64, at the joining. The connection end portion 48c is arranged in the direction in which the cover insulating layer 86c is opposed to the joint portion 64. In this case, each connection terminal 50 of the connection end portion 48c is opposed to the corresponding connection pad 73 and solder 78. The pair of partitions PW1 and PW2 of each connection terminal 50 protrude toward the joint portion 64 and are located on both sides of the solder 78 in the first direction X. Furthermore, the pair of partitions PW1 and PW2 are opposed to a groove 76 of the joint portion 64.

Figure 12:
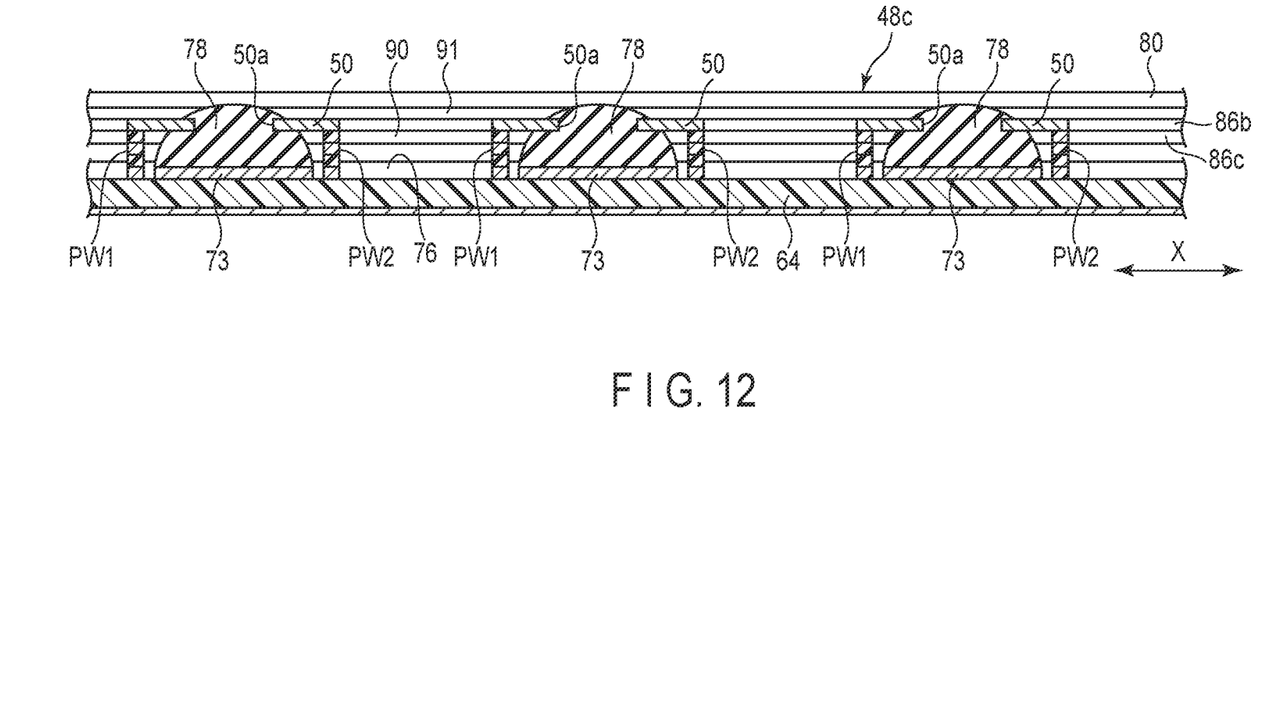
FIG. 12 is a cross-sectional view showing the tail connection end and the joint portion joined by solder.
Figure 13:
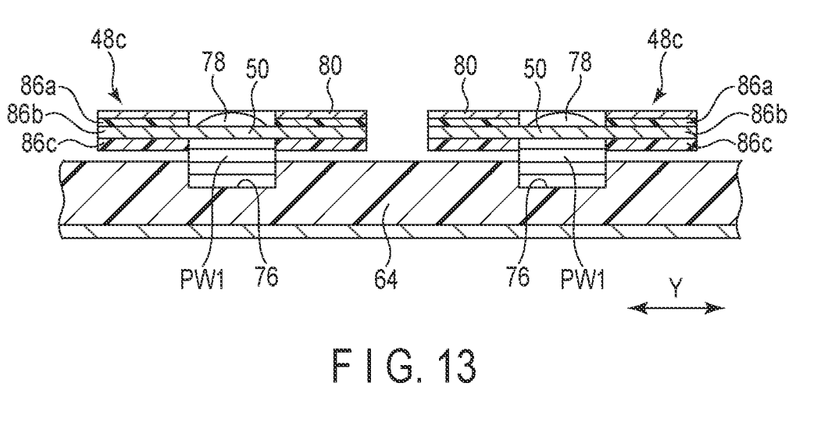
FIG. 13 is a cross-sectional view showing the tail connection end and the joint portion.

FIG. 12 is a longitudinal cross-sectional view showing the soldered connection end portion and joint portion, and FIG. 13 is a transverse cross-sectional view showing the soldered connection end portion and joint portion.

As shown in FIG. 12, thirteen connection terminals 50 are arranged to be stacked on the corresponding connection pads 73 and solder layers 78 of the joint portions 64 through the opening 90, at the joining. In this state, a laser beam is applied from the side of the connecting end portion 48c to the connecting end portion 48c and the joint portion 64. The laser light is applied to the connection terminals 50 and the solder layer 78 through the opening 91 of the connection end portion 48c. The connection terminals 50 and the solder layer 78 absorb heat, the solder layer 78 is thereby molten such that the connection terminals 50 and the connection pads 73 are soldered together. At this time, the molten solder layer 78 is dammed by the partitions PW1 or PW2, preventing the solder layer 78 from spreading to the adjacent connection pads 73 and solder layers 78. Therefore, even if the connection terminals 50 and the connection pads 73 are displaced in the first direction X, a short circuit between adjacent connection terminals 50 is prevented.

As shown in FIG. 11 and FIG. 13, the joint portion 64 includes the groove 76, and the connection pad group 72 is arranged in the groove 76, in the embodiment. Then, the partitions PW1 and PW2 of the connection terminals 50 engage with the groove 76 and regulate the movement and displacement of the connection end portion 48c in the second direction Y. Incidentally, it is desirable that the width of the groove 76 is substantially equal to the length of the partitions PW1 and PW2 in the second direction Y. The connection end portion 48c is thereby positioned with respect to the connection pad group 72 in the second direction Y. The plurality of connection terminals 50 are soldered in the state of being positioned in predetermined positions with respect to the corresponding connection pads 73. Therefore, occurrence of joint failure caused due to uneven solder or insufficient solder distribution which results from the displacement can be prevented.

As shown in FIG. 1, the actuator assembly 22 is supported to be freely rotatable around the support shaft 26 in which the actuator assembly 22 and the FPC unit 21 configured as described above are built in the base 12. Each magnetic disk 18 is located between two suspension assemblies 30. At the operation of the HDD, the magnetic heads 17 supported by the suspension assemblies 30 are opposed to the upper and lower surfaces of the magnetic disks 18, respectively. The base portion 60 of the FPC unit 21 is fixed to the bottom wall 12a of the base 12.

According to the suspension assembly and the HDD configured as described above, the connection end portion 48c of the flexure 48 comprises the partitions PW1 and PW2 erected on the respective connection terminals 50. When the connection end portion 48c is soldered to the joint portion 64 of the FPC, the molten solder is dammed by the partitions PW1 or PW2, preventing the solder from spreading wet to the adjacent connection pads 73 and solder layers 78. Therefore, even if the connection terminals 50 and the connection pads 73 are displaced in the first direction X, a short circuit between adjacent connection terminals 50 can be prevented. In addition, the joint portion 64 includes the groove 76, and the connection pad group 72 is arranged in the groove 76, in the embodiment. The partitions PW1 and PW2 of the connection terminals 50 engage with the groove 76 and regulate the movement and displacement of the connection end portion 48c in the second direction Y. The connection end portion 48c is thereby positioned with respect to the connection pad group 72 in the second direction Y. The plurality of connection terminals 50 are soldered in the state of being positioned in predetermined positions with respect to the corresponding connection pads 73. Therefore, soldering can be performed without causing the joint failure.

The advantages of the above-described embodiment act more effectively on the flexure where the number of connection terminals increases and the array pitch is narrower in accordance with the increase in the number of magnetic disks and the increase in the functions of magnetic heads.

Based on the above, according to the embodiment, a suspension assembly and a disk drive comprising this suspension assembly that are capable of preventing joint failure at the joint portion and a short circuit between the terminals, can be provided.

Next, an HDD and a suspension assembly according to another embodiment will be described. In another embodiment described below, the same portions as those of the above-described first embodiment will be denoted by the same reference numbers, their detailed description will be omitted or simplified, and only portions different from the first embodiment will be mainly described in detail.

Second Embodiment

Figure 14:
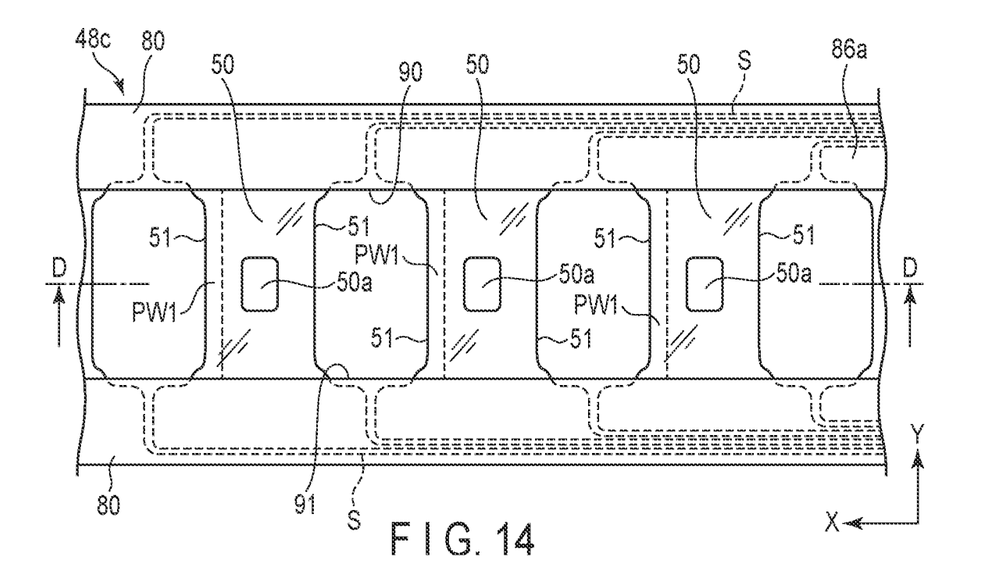
FIG. 14 is an enlarged plan view showing a portion of the tail connection end in the HDD according to a second embodiment.
Figure 15:
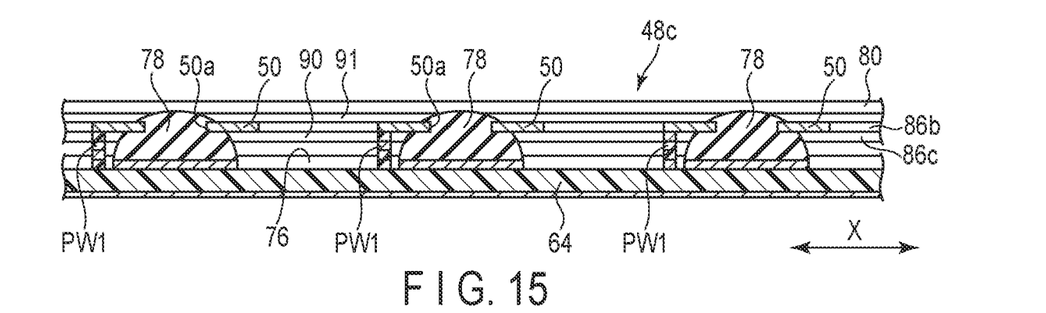
FIG. 15 is a cross-sectional view showing the tail connection end and the junction along line D-D in FIG. 14.

FIG. 14 is a plan view showing a part of a connection end portion of a flexure in an HDD according to the second embodiment, and FIG. 15 is a cross-sectional view along line D-D in FIG. 14, showing a state in which the connection end portion of the flexure is arranged to be stacked on a connection pad group of a joint portion.

As shown in FIG. 14 and FIG. 15, according to the second embodiment, each connection terminal 50 of the connection end 48c includes only one partition PW1. The other partition PW2 is omitted.

The partition PW1 is provided along one side edge of the connection terminal 50 (i.e., the left side edge of the drawing in FIG. 14) and extends in the second direction Y. In the present embodiment, the partition PW1 is provided along a side edge 51 on the same side (left side of the drawing) for all the connection terminals 50. The shape, dimensions, and the like of the partition PW1 are set to be the same as those of the partition PW in the first embodiment. The other constituent elements of the suspension assembly are common to the suspension assembly in the above-described first embodiment.

As shown in FIG. 15, the flow of solder can be regulated by the partitions PW1, and the displacement of the connection end portion 48c in the second direction can be regulated by the engagement of the partitions PW1 and the groove 76, in the second embodiment, too. In other words, the same advantages as those of the above-described first embodiment can be obtained in the second embodiment, too. In addition, according to the second embodiment, it is possible to simplify the configuration of the connection end portion and reduce the manufacturing costs, by reducing the number of partitions.

Incidentally, in the second embodiment, the partitions need only to be installed at common positions for all connection terminals, and may be provided not along the left side edge, but along the right side edge.

Third Embodiment

Figure 16:
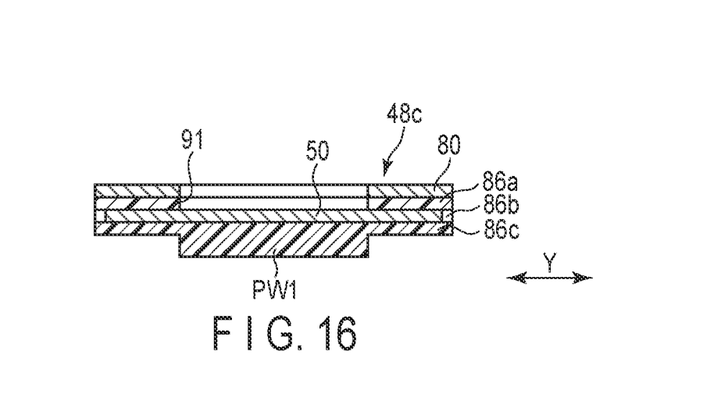
FIG. 16 is an enlarged cross-sectional view showing a part of the tail connection end in the HDD according to a third embodiment.

FIG. 16 is a transverse cross-sectional view showing a connection end portion of a flexure in an HDD according to a third embodiment. As shown in the drawing, according to the third embodiment, a partition PW1 of a connection end portion 48c is molded integrally with the other insulation layer constituting the connection end portion 48c. For example, the partition PW1 is molded integrally with a cover insulating layer 86c by an insulator.

The other constituent elements of the suspension assembly are common to the suspension assembly in the above-described first embodiment. The same advantages as those of the above-described first embodiment can be obtained in the third embodiment, too.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic disks is not limited to five, but may be four or less or six or more, and the number of suspension assemblies and the number of magnetic heads may be increased or decreased according to the number of magnetic disks installed. In the connection end portion of the suspension assembly, the shape, the size, and the like of the connection terminals are not limited to the above-described embodiments, but can be variously changed as needed. The number, type, and function of the connection terminals are not limited to the above-described embodiments, but can be variously changed in accordance with the functions of the magnetic head and the suspension assembly.

What is claimed is:

1. A suspension assembly comprising:
a support plate;
a head supported by the support plate; and
a wiring member provided on the support plate, and constituted by a stacked layer body including a first insulating layer, a conductive layer provided on the first insulating layer to form wirings and a connection terminal, and a second insulating layer formed to overlap with the conductive layer and the first insulating layer, wherein the wiring member includes a distal portion electrically connected to the head, a connection end portion extending to an outside of the support plate, and wirings extending between the distal portion and the connection end portion, and the connection end portion includes an opening extending in a first direction and penetrating the first insulating layer and the second insulating layer, connection terminals formed by the conductive layer and arranged in the first direction in the opening, and a partition provided at the connection terminal in the opening to protrude toward the side of the second insulating layer from the connection terminal beyond the second insulating layer.

2. The suspension assembly of claim 1, wherein
the connection terminals include a pair of side edges extending in a second direction intersecting the first direction, and
the partition is provided along one of the side edges of the connection terminal.

3. The suspension assembly of claim 2, wherein at the connection terminals, the partition is provided along the side edge of the same side, of the pair of side edges.

4. The suspension assembly of claim 1, wherein
the connection terminals include a pair of side edges extending in a second direction intersecting the first direction, and
the connection end portion includes the partition provided along one of the side edges of the connection terminal, and another partition provided along the other side edge of the connection terminal to protrude from a side of the second insulating layer.

5. The suspension assembly of claim 1, wherein the partition extends in a second direction intersecting the first direction and has dimensions within a width of the opening in the second direction.

6. The suspension assembly of claim 1, wherein the partition includes insulating layers stacked on the connection terminal.

7. The suspension assembly of claim 1, wherein the partition is formed integrally with the second insulating layer by an insulator.

8. A disk drive comprising:
a disk-shaped recording medium; and
a head actuator comprising a rotatable actuator block, arms extending from the actuator block, the suspension assembly of claim 1 fixed to the respective arms, a wiring board provided on an installation surface of the actuator block and including connection pads arranged side by side, and solders provided on the respective connection pads, wherein
the connection end portion of the wiring member is arranged on the wiring board to overlap with the connection pads and the solders, and the connection terminals are joined to the connection pads by the solders.

9. The disk drive of claim 8, wherein the wiring board includes a groove extending in the first direction, the connection pads are arranged in the groove, and the partition of the connection end portion is fitted in the groove.

* * * * *